Nov. 20, 1928.
B. H. MORTUS
1,692,275
HOPPER FEED FOR METAL WORKING MACHINES
Filed Nov. 1, 1924
3 Sheets-Sheet 3
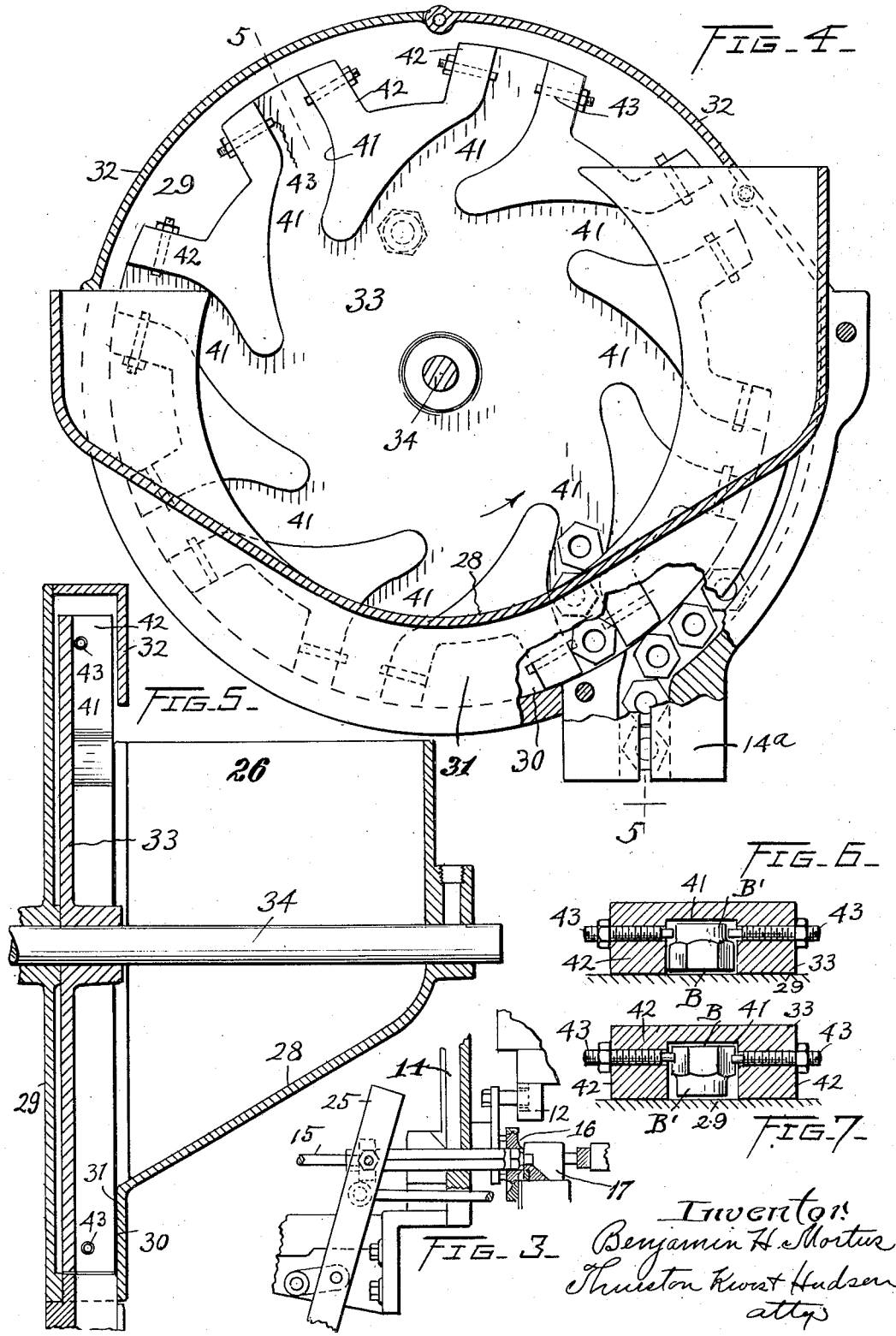

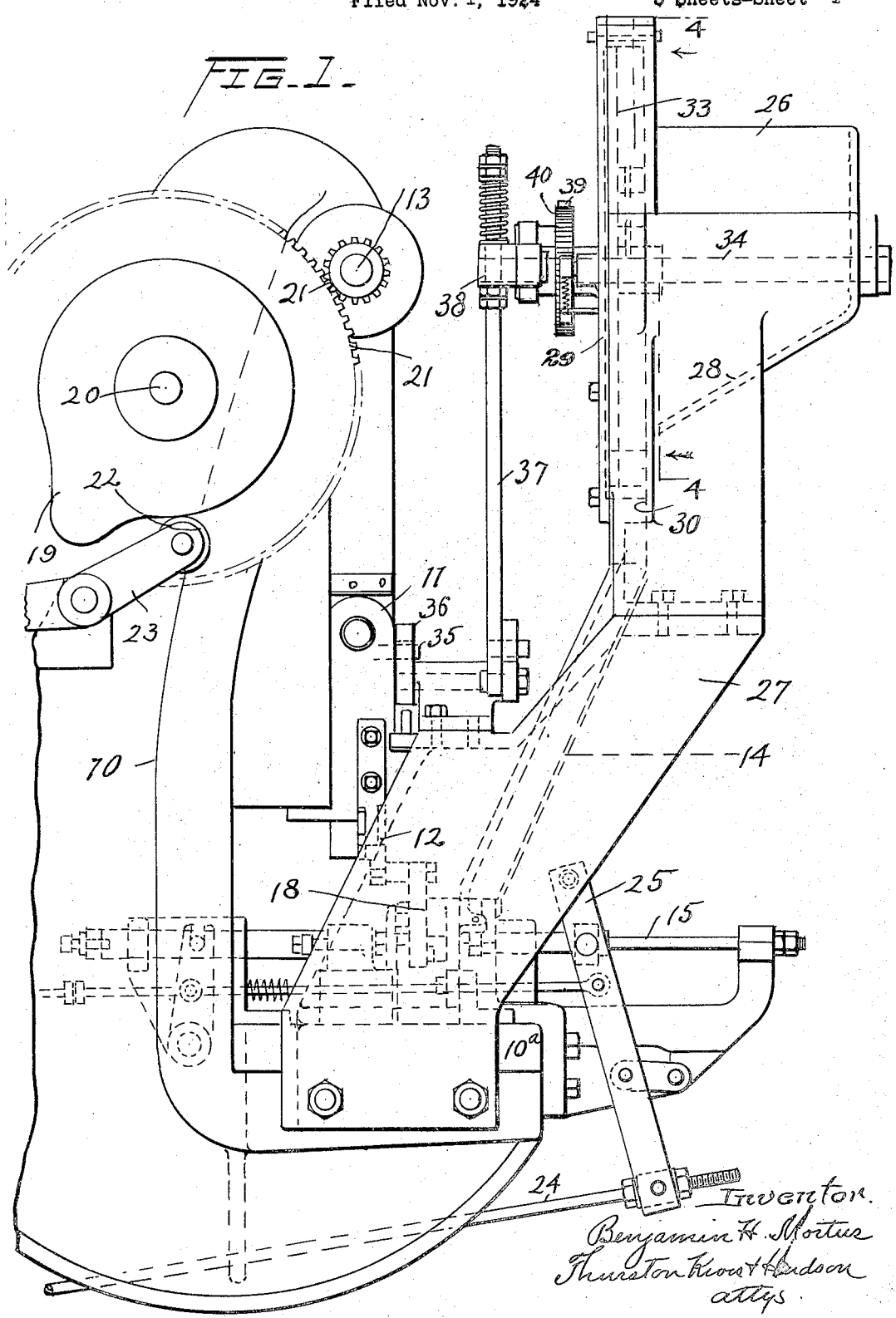

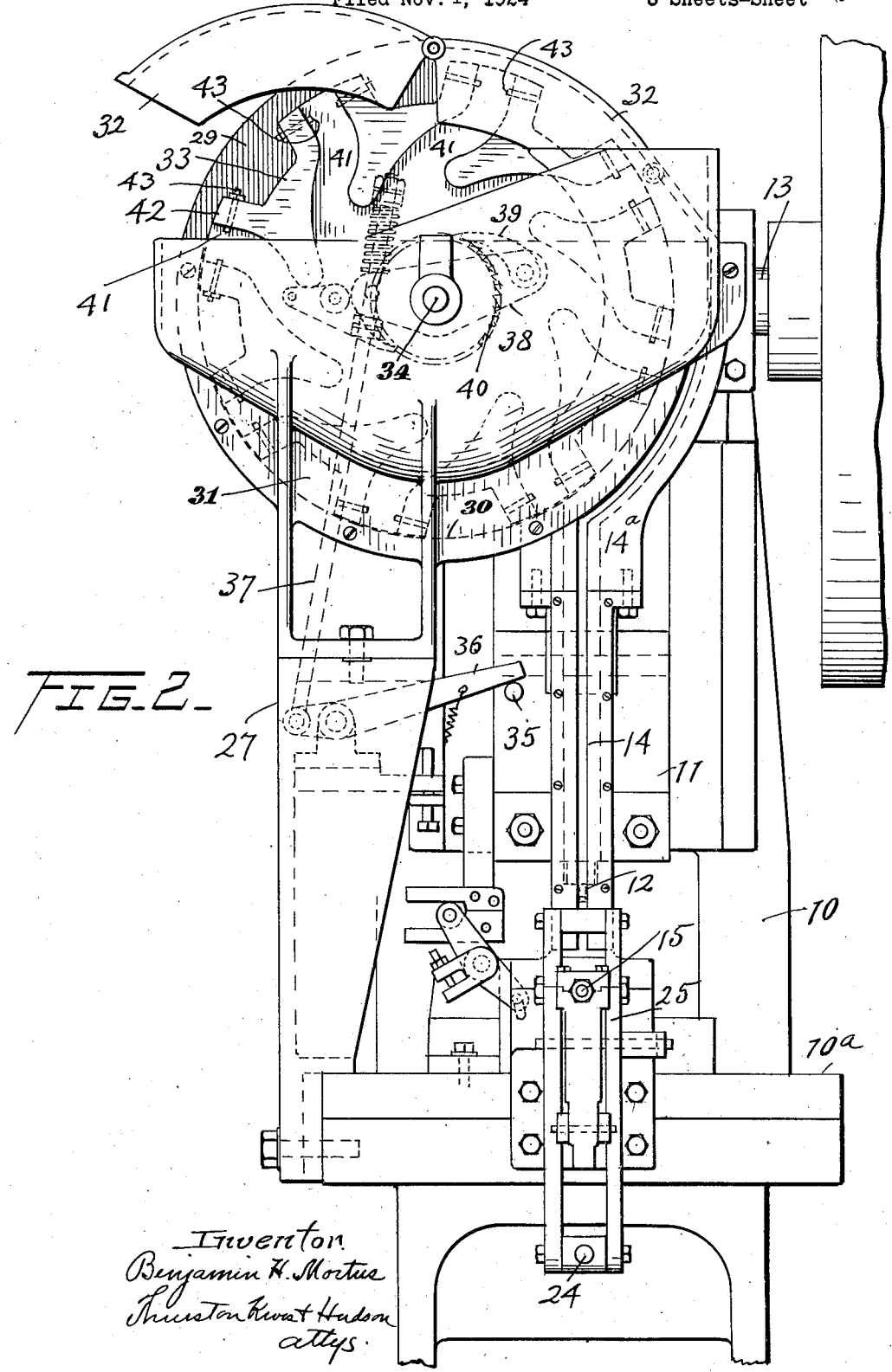

Patented Nov. 20, 1928.

1,692,275

UNITED STATES PATENT OFFICE.

BENJAMIN H. MORTUS, OF CLEVELAND, OHIO, ASSIGNOR TO THE NATIONAL SCREW AND MANUFACTURING COMPANY, OF CLEVELAND, OHIO, A CORPORATION OF OHIO.

HOPPER FEED FOR METAL-WORKING MACHINES.

Application filed November 1, 1924. Serial No. 747,304.

This invention relates to automatic feeds for metal working machines of the type wherein nuts or nut blanks and similar small devices are fed or supplied to a working tool, and which require that the devices all face in one direction when presented to the tool or when moved into the working station. My invention may be used with a variety of different machines, such, for example, as nut castellating machines and nut facing machines which require that the tool operate on one side or face of each of the blanks.

In machines of the character just referred to, as far as I am aware, automatic feeds have heretofore not been provided, and it has been customary for the operator to perform the feed manually, at least to the extent of placing the blanks one at a time in the end of a chute leading to or toward the working tool with the blanks facing in a given direction.

It is the object of the present invention to eliminate the necessity for hand feeds in machines of this character, and to provide means whereby the blanks are automatically fed from a hopper and will be positioned in a given way, or will be caused to face in a given direction before being presented to the tool or tools which operate on the blanks.

The above object is attained very effectively by my invention, which may be here briefly summarized as consisting in certain novel details of construction, and combinations and arrangements of parts which will be described in the specification and set forth in the appended claims.

In the accompanying sheets of drawings I have shown my invention applied to a nut castellating machine of the type and form constituting the subject matter of United States Letters Patent No. 1,530,974 issued to Louis Barber, March 25, 1925. In the drawings, Fig. 1 is a side elevation of the machine; Fig. 2 is a front view of the same; Fig. 3 is a fragmentary sectional view showing more in detail the castellating mechanism, parts being in elevation, viewed from the opposite side of the machine from that shown in Fig. 1; Fig. 4 is a sectional view substantially along the line 4—4 of Fig. 1, looking in the direction indicated by the arrows, this view showing particularly the feed hopper and rotary feeder co-operating therewith; Fig. 5 is a central, vertical, sectional view through the hopper and rotary feeder, the section being taken at right angles to the section of Fig. 4; and Figs. 6 and 7 are sectional views through one of the arms of the rotary feeder, Fig. 6 showing a blank facing in the right direction for delivery to the chute, and Fig. 7 showing the blank facing in the opposite direction, and therefore incapable of delivery to the chute.

Referring now to the drawings, the castellating machine to which I have shown my invention applied, includes a frame 10 carrying a vertically reciprocating slide 11 having a punch 12 for punching slots in the nut blanks B. As is customary with castellated nuts, the slots are punched or otherwise formed in an annular flange B' projecting from one side or face of the blank (see Figs. 6 and 7). The slide 11 is vertically reciprocated by a crank-shaft 13.

Heretofore the blanks has been placed by hand in an upright chute 14 extending up a suitable height above the bed 10ª of the frame. When placed in the chute it has been customary, and, in fact, necessary for the operator to face the blanks in a particular way, i. e. with the flanges to be punched or slotted projecting forwardly or inwardly.

The blanks are pushed one at a time from the bottom of chute 14 by a horizontally movable pusher 15, which at each forward stroke moves a blank forwardly into a holder 16, capable of being indexed. The rod 15 constituting the pusher has at its forward end a reduced part in the form of a die which passes through the bore of the blank, and which during the punching operation rests on an anvil 17.

As this machine is constructed, the nut blank is moved forwardly into the holder 16, and remains in the holder during a predetermined number of strokes of the punch, usually six in number, the holder 16 being indexed by an indexing member 18, operated by the slide 11. The pusher 15 is then retracted, causing the castellated blank to be ejected, and again moved forwardly so as to move another blank into the holder, whereupon the operation is repeated. The pusher 15 is preferably operated automatically, as for example, by mechanism illustrated in the Barber patent referred to, a portion of which is herein illustrated, and including a cam 19 carried by a shaft 20, connected by gearing 21 to the crank-shaft 13, the cam being engaged by a roller 22 carried at one end of a bell-crank lever 23 which is suitably connected to the pusher, the connecting means herein illustrated including a link 24 and a swinging arm 25 attached to the pusher 15.

The castellating machine is fully described in the Barber patent referred to above, and hence needs no further description herein.

In accordance with my invention, the blanks are supplied to the chute 14 from a hopper 26, which can be supported in any suitable manner, but in this instance is mounted on a bracket 27 secured to the frame 10 of the machine. It will be observed, particularly by reference to Figs. 1, 4 and 5, that the hopper is provided with a sloping bottom wall 28, and a flat vertical rear wall 29. Between the sloping bottom 28 and vertical rear wall 29 there is an annular groove or trough 30, of a width slightly larger than the greatest dimension of the blanks which are designed to be supplied to the hopper. This trough is formed by the rear wall 29, and a substantially annular flange-like front portion 31, parallel to the rear wall. The rear wall 29 is preferably circular in form, and the wall 31 is in the form of a ring or annulus, so that the trough is substantially continuous, or in the form of an annulus. The upper part of this trough is formed in two hinged sections 32 which can be swung upwardly for a purpose to be referred to presently.

Rotatable in the trough of the hopper is a rotating feeder in the form of a disk 33, which in this instance is secured to a centrally disposed shaft 34, operated by the same mechanism which operates the reciprocating punch. In this instance the feeder is given a step by step movement in the direction indicated by the arrow in Fig. 4, and this is accomplished in this case by providing on the slide 11 a pin 35, which on each upward stroke of the slide elevates the inner end of a lever 36, the outer end of which is connected by a link 37 to an arm 38 mounted on a hopper shaft 34 and carrying a pawl 39 co-operating with a ratchet disk 40 secured to the shaft.

The feeder 33, whose width is slightly less than the width of the trough 30, is provided on its inner side with a series of slots 41 having sufficient width to receive the nut blanks. These slots which extend inwardly from the periphery are not straight for their full length, but all but the outer ends thereof are curved in spiral fashion. Between the outer ends of the slots the outer or peripheral portion of the feeder 33 is notched or cut away, forming the equivalent of short radial arms 42, along or through which the straight portions of the slots 41 extend, as clearly shown in Figs. 2 and 4.

Assuming that the hopper is provided with a quantity of nut blanks, it is obvious that they will gravitate toward the trough and toward the vertically disposed feeder, and as the feeder is rotated the blanks will drop into the slots 41 as they reach a position, one after another, such that the blanks can fall into them. The width of the trough of the hopper is such that the blanks, which drop into the trough by passing down the slots of the feeder, assume a position with their axes or bores parallel to the axis of the feeder shaft, and with the flanges which are to be slotted, facing either forwardly or rearwardly.

By reference to Figs. 2 and 4, it will be observed that an extension 14ᵃ of the chute 14 joins the lower part of the hopper and extends for a distance up around the lower portion, and by reference to Fig. 4 it will be seen that the portion of the bottom wall of the trough 30 opposite this last mentioned portion of the chute is cut away so that the bottom of the trough for a predetermined circumferential or angular distance communicates with the passageway of the chute, and it may be here stated that while the slots in the feeder are passing this cut away portion in the bottom of the trough, the nut blanks may, if they are properly positioned in the slots of the feeder, pass from the slots into the chute.

As previously stated, it is desirable that the blanks pass from the slots of the feeder into the chute only in case the blanks are so positioned in the feeder slots that they lie parallel to the axis of the hopper shaft and have their flanges which are to be slotted, facing rearwardly in order that they will be in proper position to be fed to the castellating tools when they are delivered from the lower end of the chute.

In accordance with my invention, provision is made for allowing the properly positioned blanks to pass from the feeder slots into the chute, and for preventing the improperly positioned blanks from doing so. This is accomplished by providing in each of the arms 42 a pair of adjustable gauge pins or fingers 43, these fingers being preferably in the form of screws, whose inner ends project into the slot 41 near the outer end thereof, and near the back wall of the slot, as clearly illustrated in Figs. 6 and 7 wherein cross-sections of one of the arms are shown. The distance between the inner ends of each pair of fingers 43 is such that the blanks can slide from the feeder slots into the chute only in the event that the projecting flange of the blank, which is of somewhat reduced diameter, faces inwardly and is next to the back wall of the feeder, as illustrated in Fig. 6, but if the flange faces in the opposite direction, as illustrated in Fig. 7, or is positioned in any other way, it cannot pass the fingers, and is therefore carried around with the feeder, and when the slot reaches a given position, this nut blank and any other blanks that may be in the slot behind it, will slide from the slot and drop back into the hopper.

It will be seen by reference to the uppermost slot of Fig. 4, that as these improperly positioned blanks slide from the slot when it reaches a position substantially the same as the uppermost slot of Fig. 4, it will not only drop from the feeder back into the hopper, but the curve of the slot is such that it will be delivered to the hopper on the opposite side from that at which the blanks pass to the delivery chute. In other words, they are delivered to such a point in the hopper that as the feeder rotates the blanks will pass into other slots of the feeder and will again be carried around.

Thus it will be seen that the blanks will fall into the slots of the feeder as it is rotated, will be carried around toward the delivery section of the trough, and will pass into the chute only in the event that they are so positioned that they will pass the fingers of the feeder and will occupy the proper position in the chute of the machine, and that all those that are not properly positioned are held in the feeder until the slots reach a position such that the blanks can drop by gravity from them and can pass to the hopper in a position such that they may again enter the slots of the feeder, in which event they are again carried around to the delivery portion of the hopper and will then pass to the chute only in the event they are properly positioned in the slots.

It is found in practice that a sufficient percentage of the blanks thus carried around by the feeder pass to the chute, and that there is always an ample supply of blanks in the chute to maintain continuous operation of the machine. At times the chute may be only partially filled, and at times completely filled. In the latter event, that is to say, if the upper extension of the chute is completely filled, the blanks are simply carried around by the feeder, and drop into the hopper without any jamming or other damage.

Obviously, it is a simple matter to vary the rate of movement of the feeder, as, for example, by changing the size of the ratchet disk 40 to maintain a sufficient feed of properly positioned blanks into the chute to at all times maintain a quantity of blanks in the chute so that the machine may operate continuously and also at a rapid rate.

It is obvious also, that the position of the fingers 43 may be adjusted to adapt the feeder for blanks of different sizes or proportions, and it is largely for that reason that the top portion of the hopper is provided with the hinged sections 32 which can be elevated to give access to the fingers 43, and when lowered, the upper part of the rotating feeder is amply guarded against injury to the workman.

The machine not only operates to maintain a continuous supply of properly positioned blanks in the chute leading to the castellating tools, but the construction is such that it is practically impossible for any of the blanks to become jammed, and the feeder is otherwise reliable in operation.

It will be seen, therefore, that I have provided a practical hopper feed capable of being used on nut castellating machines and with other machines wherein nut blanks and other blanks of more or less similar character are adapted to be fed to operating tools, and that machines of this kind are therefore rendered wholly automatic, the necessity for the presence of an attendant or operator being dispensed with except on occasions to supply the blanks to the hopper.

I do not desire to be confined to the exact details shown and described, but aim in my claims to cover all modifications which do not involve a departure from the spirit and scope of my invention as set forth in the appended claims.

Having described my invention, I claim:

1. In a metal working machine having a tool adapted to operate on blanks, a feed hopper, a delivery member extending therefrom, a feeder for delivering the blanks from the hopper to the delivery member, and adjustable blank engaging members associated with the feeder for preventing the blanks entering the delivery member unless they face in a given direction.

2. In a metal working machine having a tool adapted to operate on blanks, a feed hopper, a delivery member extending therefrom, a feeder having means adapted to carry the blanks to the point of delivery leading to the delivery member, and adjustable retaining devices associated with the feeder for preventing the delivery of improperly positioned blanks.

3. In a metal working machine having a tool adapted to operate on blanks, a feed hopper, a delivery member extending therefrom, a feeder for delivering blanks to the delivery member and provided with slots adapted to receive the blanks, and adjustable means associated with the slots to prevent the passage of the blanks from the slots to the delivery member unless the blanks occupy a given position in the slots.

4. In a metal working machine having a tool adapted to operate on blanks, a feed hopper, a delivery member extending from said hopper, and a rotatable feed disc for delivering blanks from the hopper to the delivery member forming a side wall of the hopper with its periphery overlying said delivery member, said feed disc having curved open-ended slots in the inner face thereof extending radially to its periphery for receiving the blanks and delivering the properly positioned blanks to the delivery member and extending with curved sections inwardly in the direction of rotation for returning improperly positioned blanks to the opposite side of the hopper.

5. In a metal working machine having a tool adapted to operate on blanks, a feed hopper, a delivery member extending therefrom, a feeder for delivering blanks to the delivery member and provided with slots adapted to receive the blanks, and means projecting into the slots to prevent the passage of blanks through the slots unless properly positioned therein.

6. In a metal working machine having a tool adapted to operate on blanks, a feed hopper, a delivery member extending therefrom, a feeder for delivering blanks from the hopper to the delivery member and provided with slots adapted to receive the blanks, and adjustable gauge fingers projecting into each slot so as to prevent the delivery of improperly positioned blanks.

7. In a metal working machine having a tool adapted to operate on blanks, a feed hopper, a delivery member extending from said hopper, a rotatable feed disc for delivering blanks from the hopper to the delivery member, said disc having on the inner face thereof spaced slots, each of which is of a length to receive a plurality of blanks and at its inner portion extends inwardly of the disc and forwardly in the direction of rotation whereby such blanks as do not pass into the delivery member are carried substantially a full quadrant above and past the axis of the disc and are discharged into the opposite side of the hopper.

8. In a metal working machine having a tool adapted to operate on blanks, a feed hopper, a delivery member extending from said hopper, and a rotatably mounted feed disc for delivering blanks from the hopper to the delivery member, said disc having on the inner face thereof spaced slots, each extending inwardly from the periphery and of a length to receive a plurality of blanks and each being disposed angularly with respect to a radial line, each slot terminating short of the center of the disc and having unobstructed inner ends to permit blanks to pass freely into and out of the slots during rotation of the disc, each slot having means for permitting the passage of properly positioned blanks and preventing discharge of improperly positioned blanks from the peripheral end thereof.

9. In a metal working machine having a tool adapted to operate on blanks, a feed hopper, a delivery member extending therefrom, a feed disc in the hopper having slots extending to the periphery thereof, from the outer ends of which blanks may be delivered to the delivery member and from the inner ends of which undelivered blanks may be returned to the hopper, and gauge fingers projecting into the slots to prevent delivery of improperly positioned blanks.

10. In a metal working machine having a tool adapted to operate on blanks, a feed hopper having a depressed arcuate channel in the bottom thereof, said channel having an elongated opening, a delivery chute overlying said opening, a feed disc rotatably mounted in the hopper with its periphery in said depressed channel, said disc having circumferentially spaced raised portions extending inwardly from the periphery thereof and forming slots between them for passage of blanks, said raised portions and slots extending inwardly at an angle with respect to radial lines, and means for rotating said disc.

11. In a metal working machine having a tool adapted to operate on blanks, a feed hopper having a depressed arcuate channel in the bottom thereof, said channel having an elongated opening, a delivery chute overlying said opening, a feed disc rotatably mounted in the hopper with its periphery in said depressed channel, said disc having circumferentially spaced raised portions extending inwardly from the periphery thereof and forming slots between them for passage of blanks, said raised portions and slots extending inwardly at an angle with respect to radial lines, and means for rotating said disc in the direction toward which said projections and slots are inclined.

12. In a metal working machine having a tool adapted to operate on blanks, a feed hopper having a depressed arcuate channel in the bottom thereof, said channel having an elongated opening, a delivery chute overlying said opening, a feed disc rotatably mounted in the hopper with its periphery in said depressed channel, said disc having circumferentially spaced raised portions extending inwardly from the periphery thereof and forming slots between them for passage of blanks, said raised portions and slots extending inwardly at an angle with respect to radial lines, means for rotating said disc, and means carried by said raised portions for preventing delivery of improperly positioned blanks.

13. In a metal working machine having a tool adapted to operate on blanks, a feed hopper having a depressed arcuate channel in the bottom thereof, said channel having an elongated opening, a delivery chute overlying said opening, a feed disc rotatably mounted in the hopper with its periphery in said depressed channel, said disc having circumferentially spaced raised portions extending inwardly from the periphery thereof, the adjacent edges of said raised portions being curved whereby curved slots for the passage of blanks are formed between them, and means for rotating said disc.

14. In a metal working machine having a tool adapted to operate on blanks, a feed hopper having a depressed arcuate channel in the bottom thereof, said channel having an elongated opening, a delivery chute overlying said opening, a feed disc rotatably mounted in the hopper with its periphery in said depressed channel, said disc having circumferentially spaced raised portions extending inwardly from the periphery thereof and forming slots between them for passage of blanks, said raised portions and slots extending inwardly at an angle with respect to radial lines, transversely disposed gauge fingers carried by said raised portions and projecting into said slots to prevent passage of improperly positioned blanks, and means for driving said disc.

15. In a metal working machine having a tool adapted to operate on blanks, a feed hopper having a depressed arcuate channel in the bottom thereof, said channel having an elongated opening, a delivery chute overlying said opening, a feed disc rotatably mounted in the hopper with its periphery in said depressed channel, said disc having circumferentially spaced raised portions extending inwardly from the periphery thereof and forming slots between them for passage of blanks, said raised portions and slots extending inwardly at an angle with respect to radial lines, transversely disposed gauge fingers carried by said raised portions and projecting into said slots to prevent passage of improperly positioned blanks, said fingers being adjustable for blanks of different sizes, a guard member extending over the top of the disc, said guard member having a hinged section permitting access to the peripheral portion of the disc.

16. In a metal working machine having a tool adapted to operate on blanks, a feed hopper, a delivery member extending from said hopper, and a rotatably mounted feed disc for delivering blanks from the hopper to the delivery member, said disc having on the inner face thereof spaced slots, each of which extends radially inward from the periphery of the disc for a part of its length and then angularly with respect to the radial line and is of such length as to receive a plurality of blanks, each slot terminating short of the center of the disc and having unobstructed inner ends to permit blanks to pass freely into and out of the slots during rotation of the disc.

17. In a metal working machine having a tool adapted to operate on blanks, a feed hopper, a delivery member extending therefrom, a feed disc in the hopper having slots extending to the periphery thereof, said slots extending for a part of their length along radial lines of the disc and for the remaining part of their length curved with respect thereto.

18. In a metal working machine having a tool adapted to operate on blanks, a feed hopper, a delivery member extending therefrom, a feed disc in the hopper having slots extending to the periphery thereof, each of said slots being arranged radially of the disc at the periphery and reversely curved toward the center.

In testimony whereof, I hereunto affix my signature.

BENJAMIN H. MORTUS.